United States Patent
Ryan

(10) Patent No.: US 8,950,438 B2
(45) Date of Patent: Feb. 10, 2015

(54) METHOD AND COMPOSITIONS FOR DELIVERY OF A CONCENTRATED QUANTITY OF SEALING ELEMENTS TO A LEAK SITE IN A VESSEL

(75) Inventor: Nicholas John Ryan, Coply (GB)

(73) Assignee: Brinker Technology Ltd, Aberdeen (GB)

( * ) Notice: Subject to any disclaimer, the term of this patent is extended or adjusted under 35 U.S.C. 154(b) by 370 days.

(21) Appl. No.: 13/264,047

(22) PCT Filed: Apr. 16, 2010

(86) PCT No.: PCT/GB2010/050634
§ 371 (c)(1),
(2), (4) Date: Dec. 7, 2011

(87) PCT Pub. No.: WO2010/119296
PCT Pub. Date: Oct. 21, 2010

(65) Prior Publication Data
US 2012/0067447 A1    Mar. 22, 2012

(30) Foreign Application Priority Data
Apr. 16, 2009 (GB) .................... 0906541.8

(51) Int. Cl.
*F16L 55/16* (2006.01)
*F16L 55/164* (2006.01)
*E21B 29/10* (2006.01)
*E21B 33/138* (2006.01)

(52) U.S. Cl.
CPC ............... *F16L 55/164* (2013.01); *E21B 29/10* (2013.01); *E21B 33/138* (2013.01)
USPC ............. 138/98; 166/193; 166/284; 166/285; 166/292

(58) Field of Classification Search
USPC .............. 138/97, 98; 166/179, 192, 193, 284, 166/285, 292, 293, 294, 295
See application file for complete search history.

(56) References Cited

U.S. PATENT DOCUMENTS

| | | | | |
|---|---|---|---|---|
| 2,754,910 A | * | 7/1956 | Derrick et al. | 166/284 |
| 2,933,136 A | * | 4/1960 | Ayers et al. | 166/284 |
| 3,011,548 A | | 12/1961 | Holt | |
| 3,041,204 A | * | 6/1962 | Green | 427/238 |
| 3,137,318 A | * | 6/1964 | Maneri et al. | 138/97 |

(Continued)

FOREIGN PATENT DOCUMENTS

| | | |
|---|---|---|
| GB | 2294049 A | 4/1996 |
| GB | 2458215 A | 9/2009 |

(Continued)

OTHER PUBLICATIONS

Dauvergne, Bertrand, "International Search Report" for PCT/GB2010/050634, as mailed Jul. 16, 2010, 4 pages.

*Primary Examiner* — Patrick M Buechner
(74) *Attorney, Agent, or Firm* — Winstead PC

(57) ABSTRACT

A method of delivering a concentrated quantity of sealing elements to a leak site in a vessel includes deploying a flexible body of material and at least one sealing element into fluid flowing within the vessel upstream of the leak site. The body of material transports the sealing elements through the vessel to the leak site where the body of material is drawn to the leak by fluid flow created by a pressure differential at the leak site. The sealing element(s) are constrained by the body of material at the leak site such that the sealing element(s) become(s) entrained within the leak.

45 Claims, 2 Drawing Sheets

(56) References Cited

U.S. PATENT DOCUMENTS

| | | | |
|---|---|---|---|
| 3,144,049 A * | 8/1964 | Ginsburgh | 138/97 |
| 3,227,572 A * | 1/1966 | Watson et al. | 405/264 |
| 3,292,700 A * | 12/1966 | Berry | 166/284 |
| 3,376,934 A * | 4/1968 | William et al. | 166/193 |
| 3,613,789 A * | 10/1971 | Son, Jr. | 166/281 |
| 3,615,794 A * | 10/1971 | Nimerick | 523/130 |
| 3,647,000 A | 3/1972 | Rowley et al. | |
| 4,139,060 A * | 2/1979 | Muecke et al. | 166/281 |
| 4,183,406 A * | 1/1980 | Lundberg et al. | 166/295 |
| 4,187,909 A * | 2/1980 | Erbstoesser | 166/284 |
| 4,195,690 A * | 4/1980 | Erbstoesser et al. | 166/281 |
| 4,244,425 A * | 1/1981 | Erbstoesser | 166/284 |
| 4,291,069 A * | 9/1981 | Pilny | 427/140 |
| 4,366,194 A * | 12/1982 | Pilny et al. | 427/385.5 |
| 4,407,368 A * | 10/1983 | Erbstoesser | 166/284 |
| 4,505,334 A * | 3/1985 | Doner et al. | 166/284 |
| 4,582,091 A | 4/1986 | Ells | |
| 5,065,822 A * | 11/1991 | Miller et al. | 166/295 |
| 5,117,909 A * | 6/1992 | Wilton et al. | 166/277 |
| 5,191,931 A * | 3/1993 | Himes et al. | 166/282 |
| 5,253,709 A * | 10/1993 | Kendrick et al. | 166/284 |
| 5,309,995 A * | 5/1994 | Gonzalez et al. | 166/284 |
| 5,310,489 A * | 5/1994 | Sharif | 507/203 |
| 5,485,882 A * | 1/1996 | Bailey et al. | 166/284 |
| 6,172,134 B1 * | 1/2001 | Cooke | 523/176 |
| 6,380,138 B1 * | 4/2002 | Ischy et al. | 507/204 |
| 6,777,377 B2 * | 8/2004 | Myers et al. | 507/120 |
| 6,875,729 B2 * | 4/2005 | Verlaan et al. | 507/269 |
| 7,647,964 B2 * | 1/2010 | Akbar et al. | 166/193 |
| 7,810,523 B2 * | 10/2010 | McEwan et al. | 138/97 |
| 7,856,864 B2 * | 12/2010 | McEwan et al. | 73/40.5 R |
| 8,061,389 B2 * | 11/2011 | McEwan | 138/98 |
| 2006/0037753 A1 * | 2/2006 | Hanes, Jr. | 166/295 |
| 2006/0162930 A1 * | 7/2006 | Gronsveld et al. | 166/293 |
| 2007/0169935 A1 * | 7/2007 | Akbar et al. | 166/284 |
| 2008/0017376 A1 * | 1/2008 | Badalamenti et al. | 166/292 |
| 2009/0008095 A1 * | 1/2009 | Duncum et al. | 166/292 |
| 2009/0101334 A1 * | 4/2009 | Baser et al. | 166/193 |
| 2009/0255674 A1 * | 10/2009 | Boney et al. | 166/284 |
| 2010/0200235 A1 * | 8/2010 | Luo et al. | 166/284 |
| 2011/0024988 A1 * | 2/2011 | Ryan et al. | 277/316 |
| 2011/0198812 A1 * | 8/2011 | Ryan et al. | 277/314 |
| 2011/0221137 A1 * | 9/2011 | Obi et al. | 277/316 |
| 2012/0067447 A1 * | 3/2012 | Ryan | 138/97 |
| 2012/0080114 A1 * | 4/2012 | McEwan | 138/98 |

FOREIGN PATENT DOCUMENTS

| | | |
|---|---|---|
| WO | WO-01/86191 A1 | 11/2001 |
| WO | WO-02/052238 A1 | 7/2002 |
| WO | WO-03/093713 A1 | 11/2003 |
| WO | WO-2008/001112 A1 | 1/2008 |
| WO | WO-2009/112863 A1 | 9/2009 |
| WO | WO-2010/058224 A1 | 5/2010 |

* cited by examiner

METHOD AND COMPOSITIONS FOR DELIVERY OF A CONCENTRATED QUANTITY OF SEALING ELEMENTS TO A LEAK SITE IN A VESSEL

This invention relates to methods of conveying or delivering sealing elements to a target area in a vessel, and particularly but not exclusively to methods of conveying or delivering sealing elements to the required location in vessels, valves, pipes or ducts. The present invention also relates to sealing compositions and in particular but not exclusively, the present invention relates to sealing compositions which are adapted to reduce or stop seepage through a leak in a vessel, valve, pipe or duct. More particularly, the present invention relates to sealing compositions which are particularly suitable for sealing leaks in vessels, pipes, valves or ducting used to transport hydrocarbons, water, control and process fluids.

The present Applicant has for many years been developing techniques for sealing and stemming leaks from ducts carrying, for example, hydrocarbons, water, control and process fluids.

The Applicant's patent application WO-A-01/86191 discloses a plurality of elements, each in the form of a membrane, which are introduced into a duct to be carried along the duct by the flow of the fluid therein. At the locality of the leak, at least one of the sealing elements is captured by a pressure differential associated with the leak and is thereby drawn to and held in position at the leak for stemming or sealing it.

The Applicant's patent application WO-A-03/93713 discloses introducing a plurality of sealing elements into a duct which have an effective size less than the effective size of the leak. Even though the pressure differential attributable to the leak is relatively small, the sealing elements are drawn to, move over and build up with the duct at the leak and reduce seepage therefrom.

As discussed in these two applications, through the techniques disclosed, it is possible to reduce or eradicate the problems associated with leakage from ducts which are inaccessible or only accessible with considerable difficulty.

However, a problem remains with the techniques disclosed in the aforesaid two applications in that it can be difficult to convey the sealing element(s) to the leak site within the duct in sufficient numbers to ensure that an effective seal is formed. In particular this can be due to the density of the elements(s) particularly in comparison to the fluids flowing in the ducts which act to transport the element(s) to the required location.

Additionally, large diameter pipes or ducts may require a significant volume of sealing elements to be deployed in order to ensure that a sufficient number of elements reach the leak site. Controlling the delivery of the sealing elements to the leak site would greatly enhance the cost effectiveness of the sealing operation and minimise any risk to infrastructure.

A further problem with the previously proposed techniques is ensuring that once a sufficient number of sealing elements are conveyed to the leak site, they are prevented from flowing or falling away from the required location before they can become entrained within the leak. Solving this problem further enhances the cost effectiveness of the sealing operation as it further minimises the amount of the sealing composition required to effect a seal in the duct.

When a leak forms in the duct, a pressure differential is created between the interior and exterior of the duct. Fluid flow created by the pressure differential carries the sealing elements to the site of the leak. The target area for the sealing elements is an area of the duct interior surface or wall adjacent to or surrounding the leak, including the edges of the duct wall which define the aperture through which fluids can be lost. In the following description this target area will be referred to as the leak site. In some cases the pressure differential may be insufficient to draw the sealing elements towards the site and entrain them within the leak site. The longer an element can be held in the vicinity of the leak site, the more likely the element will be entrained within the leak site and the leak will be plugged.

Moreover, in the hydrocarbon industry there are particular safety constraints which often require a double seal barrier between the hydrocarbon carrying duct and the external environment. If there is then a small leak, even though the volume leakage of hydrocarbon due to seepage may be relatively small, i.e. a trickle leakage flow, it is nevertheless important that such leaks are completely sealed for health and safety reasons or for environmental reasons. In addition, leak development and leak appearance is a dynamic process and the techniques disclosed in the aforesaid two applications do not provide a way of sealing such leaks.

The present invention seeks to provide a method for overcoming the aforementioned disadvantages of the prior art and provide an improved method of delivering sealing elements to the leak site thereby reducing or completely sealing the leak.

Furthermore, the present invention seeks to provide a method of delivering a concentrated quantity of sealing elements to the leak site for use in reducing or completely sealing the leak.

Additionally, the present invention also seeks to provide sealing compositions which address the above mentioned problems and overcome or at least mitigate these problems.

According to one aspect of the present invention there is provided a method of delivering a concentrated quantity of sealing elements to a leak site in a vessel comprising the steps of deploying a flexible body of material and at least one sealing element into fluid flowing within the vessel upstream of the leak site whereby the body of material transports the sealing elements through the vessel to the leak site where the body of material is drawn into the leak by fluid flow created by a pressure differential at the leak site, and wherein the sealing element(s) are constrained by the body of material at the leak site such that the sealing element(s) become(s) entrained within the leak site.

Conveniently the passage of material through the vessel is controlled to target the delivery of the sealing elements to the leak site.

Advantageously the body of material is drawn through the leak and pulls the sealing element(s) into the leak to effect a seal.

Advantageously the passage of the body of material through the vessel is controlled by varying the density of the body of material and/or the density of the sealing elements to ensure that the body of material flows through the vessel at the optimum position to be drawn to the leak site.

Preferably the sealing element is/are provided within the body of material and are transported within the body of material to the leak site.

Conveniently the sealing element(s) is/are introduced into the vessel downstream of the body of material such that as the body of material flows along the vessel it drives the sealing element(s) through the vessel.

Advantageously the body of material prevents the sealing element(s) from rising to the surface of the vessel.

Advantageously, the body of material may be contained within a frangible membrane and the method may further comprise rupturing the membrane upon impact with the leak site to deliver the sealing elements directly to the leak site.

Preferably the density of the body of material is selected in response to the density of the fluids flowing within the vessel.

Alternatively or additionally, the density of the body of material may be selected in response to the position of the leak site upon the inner surface of the vessel.

In one embodiment the sealing elements are located on the interface between the body of material and the fluids flowing within the vessel.

In a further embodiment the sealing elements are located in front of the interface between the body of material and the fluids flowing within the vessel.

In one embodiment of the invention the shape and size of the body of material is selected to closely match the interior shape and size of the vessel. In another embodiment, the body of material may be pumped into the vessel. The body of material may be flexible or adaptable such that upon deployment into the vessel the body of material fills the entire diameter or internal cross-section of the vessel. Additionally in some embodiments the sealing elements may be introduced into the vessel downstream of the body of material such that as the body of material flows along or down a vertical vessel where the sealing elements are forced along the vessel until they reach the leak site.

In one embodiment, the vessel is a valve, pipe, o-ring or a duct, although as would be appreciated by the person skilled in the art, the methods of the present invention may be used to seal any leak, such as but not limited to remediation of seal failure, tubing joints, pig launcher/receiver, hydrants, heat exchangers and glands.

According to a further aspect of the present invention there is provided a sealing composition comprising a flexible body of material and at least one sealing element, the body of material being adapted to transport the sealing element(s) in a controllable and targeted manner to a leak site within a vessel and to constrain the sealing element(s) at the leak site.

Preferably the body of material and at least one sealing element form a slug which is transportable through the vessel by fluids flowing within the vessel.

Conveniently the body of material comprises a gel. Conveniently, the body of material comprises a viscosifier, most preferably a non-Newtonian viscosifer, and may comprise Xanthium gum or guar gum.

Advantageously the body of material may comprise Xanthium gum or guar gum crosslinked with agents including but not limited to borax or sodium borate.

Advantageously, the sealing element(s) is/are elastomeric.

Preferably the density of the body of material and or the density of the sealing elements is selected depending upon the density of the fluids flowing in the vessel. For example, the density may be selected such that the sealing composition floats within the fluid flowing in the vessel. Alternatively the density may be selected such that the sealing composition travels along the vessel at a submerged position within the fluid flow.

Preferably, the sealing composition further comprises a membrane, the membrane surrounding the body of material. In some embodiment, the membrane may be relatively thin in comparison to the size of the body of material. In some embodiments may be frangible.

The membrane may comprise an elastomeric material such as but not limited to latex, natural rubber, NBR, HNBR and FKM.

Preferably the membrane is adapted to rupture upon impact with the leak site to ensure that a concentration of sealing elements are delivered to the leak site.

Alternatively, the body of material and sealing elements may be deployed in a sealed container, for example but not limited to a pipeline pig or a wireline tool.

Conveniently as the container approaches the leak site, or alternatively once it reaches the leak site, the body of material and sealing elements may be forced from the container onto the leak site.

Methods according to the present invention may include sealing the container in position within the vessel at or adjacent the leak site prior to forcing the body of material and the sealing elements from the container.

In some embodiments, the sealing elements are provided on the outer surface of the body of material. This embodiment is particularly suited to delivering the sealing elements to a selected location around the inner surface of the duct and particularly to delivering a concentrated supply of sealing elements to the leak site. This embodiment ensures that the quantity of sealing elements is most concentrated at the wall adjacent the leak site. This is particularly pertinent to large diameter or cross-section vessels where the dosage size of the sealing elements would be significantly greater than for free flowing sealing elements.

In a further embodiment the sealing elements may be provided on an interface of the body of material and the fluid flowing within the vessel. Additionally or alternatively, the sealing elements may be provided on an interface of the body of material and the interior surface of the vessel.

The sealing elements may be uniformly or randomly distributed through the body of material or only provided at selected locations.

In some embodiments the body of material may be adapted to degrade over time such that the body will eventually dissolve within the fluids flowing in the vessel. Additionally or alternatively the body of material may be adapted to undergo a change or degrade for example based upon the temperature within the vessel, a change in temperature within the vessel or within the fluid flowing in the vessel, a reaction to an agent such as a chemical agent deployed into the vessel or in response to light stimulation, such as by ultraviolet light.

Preferably the body of material has a higher viscosity than the fluid(s) flowing within the vessel in order to assist in retaining the sealing elements within the body of material. Alternatively, the body of material may comprise or be formed of a material similar or identical to the fluids flowing in the vessel depending upon the concentration of sealing elements deployed with the body of material.

In some embodiments a lubricant may be applied to the outer surface of the body of material to assist in transport of the body of material and the sealing elements through the vessel.

Advantageously a surfactant may be added to the body of material to promote the boding between the body and the sealing element(s).

Preferably, the sealing composition comprises a range of different sized sealing elements. The sizes of the individual sealing elements may be selected depending upon the size of the leak to be sealed.

Conveniently, the sealing elements may comprise an elastomeric material, silicone rubbers, polyurethane rubbers, natural rubbers, nitrile rubbers and/or a flouropolymer elastomer.

The sealing elements may be formed into a shape corresponding to any one of planar-oblong, cubes, spheres, pyramids, octahedrons, tetrahedrons, thistle-seed shaped, filament shaped or of an irregular shape.

According to a further aspect of the present invention there is provided a sealing composition comprising at least one sealing element, said sealing element comprising a trace element.

Advantageously the trace element is a dye. Alternatively the trace element is a transmitter which sends out a signal which can be monitored by a suitable receiver to determine the location of the sealing element within a vessel.

In one embodiment the sealing composition may comprise sealing elements with different characteristics, each of which has an associated different trace element. For example, different sealing elements of different size or density may have a different coloured dye applied thereto or a different transmitter incorporated therewith such that by analysing the colour of the sealing elements escaping from the vessel or the location of the sealing elements within the vessel, information as to the characteristics of the leak site such as size or position may be obtained.

Sealing elements of the third aspect of the invention may be used in either of the first of second aspects of the invention.

Embodiments of the present invention will now be described in detail with reference to the accompanying drawings, in which:—

Figures 3, 4:
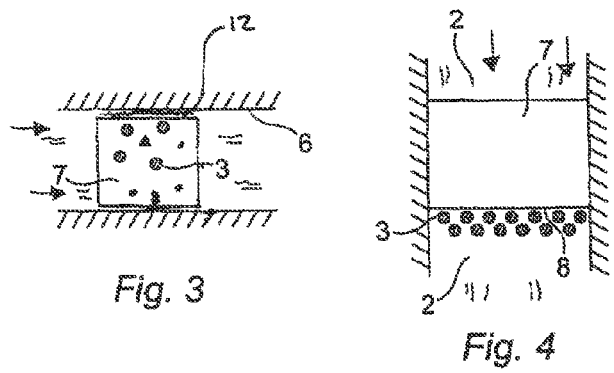
Figure 5:
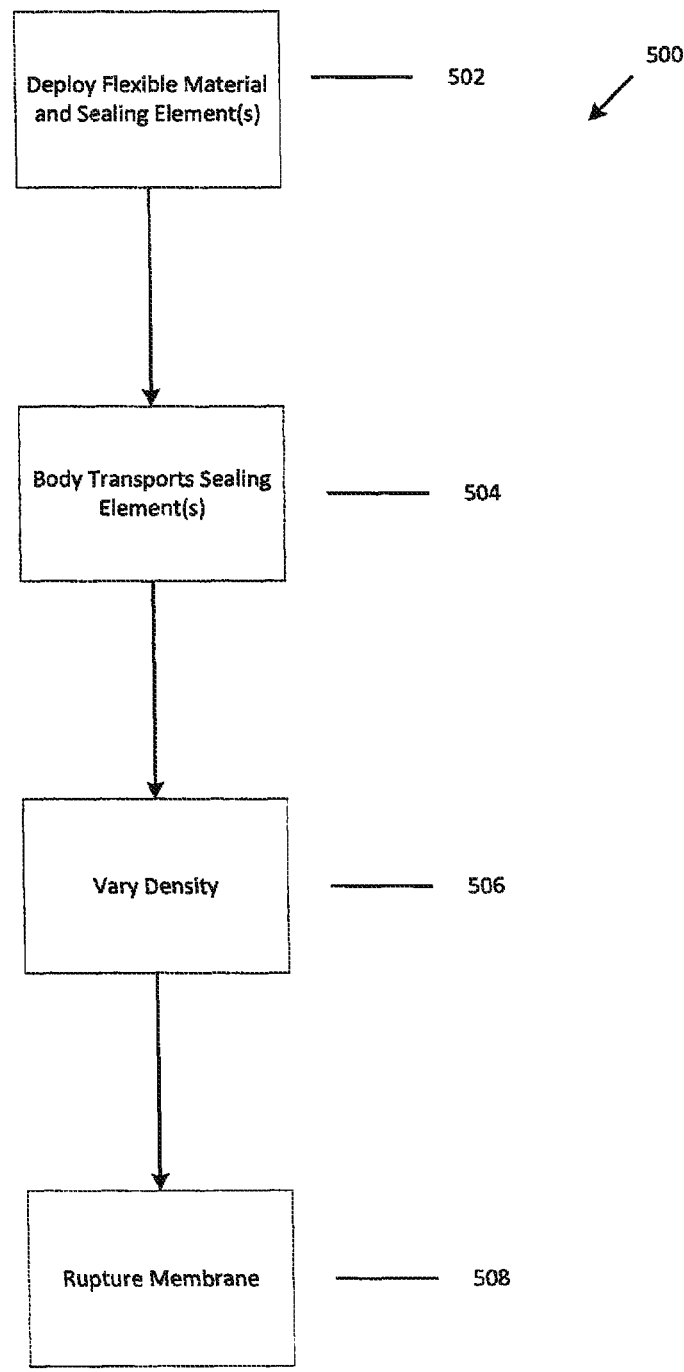

FIG. 3 illustrates, schematically a sealing composition according to a third embodiment of the present invention in which sealing elements are provided on the outer surface of the body of material, FIG. 4 illustrates, schematically a sealing composition according to a fourth embodiment of the present invention in which the sealing elements are deployed in front of or below the body of material at an interface between the body of material and the fluid flowing in the vessel, and FIG. 5 is a flow chart of an illustrative method of delivering a concentrated quantity of sealing elements to a leak site in a vessel.

Figures 1, 2:
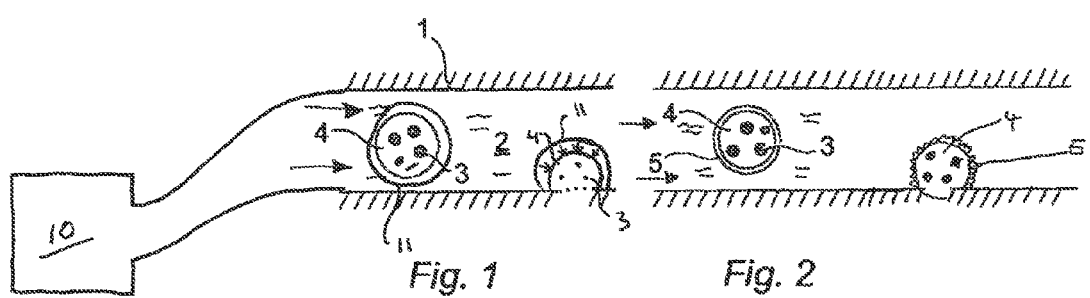
FIG. 1 illustrates, schematically, a sealing composition according to one embodiment of the present invention.
FIG. 2 illustrates, schematically a sealing composition according to a second embodiment of the present invention in which a membrane is formed around the outer surface of a body of material.

Turning now to the drawings, a vessel which is depicted as a duct 1 is shown in FIG. 1. The duct is shown as being horizontally orientated but could alternatively be vertically orientated or indeed provided at any orientation between horizontal or vertical. If a leak develops in a wall of the duct, fluids 2 flowing within the duct will be lost through the leak site.

A sealing composition according to a first embodiment of the invention comprises at least one discrete sealing element 3 carried within a body of flexible material 4. Preferably a plurality of sealing elements 3 are provided. In some embodiments the sealing elements may be uniformly distributed within the body of material. Alternatively, the sealing elements may be randomly distributed within the body of material 4. In each case however the sealing element(s) is/are constrained from falling out of the body of material and/or supported by the body of material and as the body of material passes through the duct, the sealing element(s) is/are carried through the duct. Furthermore, as will be explained further below, in some embodiments it is useful to have the sealing elements distributed over the outer surface of the body of material.

The body of material 4 is adapted to travel along the duct being carried by the fluids flowing in the duct. When a leak forms in the duct, a pressure differential is created between the interior and exterior of the duct. Fluid flow created by the pressure differential carries the sealing elements to the site of the leak.

In a first example the body of material comprises a viscosified fluid formed using a sugar or syrup solution which will support the sealing elements.

Alternatively the sugar solution may be replaced by other Newtonian viscosifiers such as guar gum or Xanthan gum. One example of Xanthan gum which is sold under the Trade Mark DUE-VIS and produced by MISwaco. This is a high molecular weight biopolymer with a specific gravity of 1.5 and a bulk density of 8000 kg/m$^3$ and is added to water at concentrations between 1.43 to 11.4 kg/m$^3$.

An example of a suitable clay based high temperature viscosifier with a specific gravity of 1.5 to 1.7 and a bulk density of 560 kg/m$^3$ is sold under the trade mark TRUVIS also produced by MISwaco, which is used with brine-oil and mixed in concentrations of 8.6 to 28.3 kg/m$^3$.

A suitable high temperature clay based oil viscosifier for use with oil based fluids and having a specific gravity of 1.5 and a bulk density of 8000 kg/m$^3$ is sold under the Trade Mark VERSAGEL HT, also produced by MISwaco and used in concentrations of 8 to 28 kg/m$^3$.

Non Newtonian viscosifiers, also known as pseudoplastics, have a greater viscosity at rest than when a shear force is applied to them. Xanthan gum is particularly suitable in this example due to its stability over a wide range of ph and temperatures.

Such a body of material provides support for the sealing element(s) and prevents them from dropping out of the body during progress through the vessel, particularly when used in narrow bore pipe or annuli. The body will also engulf the sealing element(s) such that they move in unison through the vessel.

In a further example, cross-linked viscosifiers may be used, for example guar gum cross-linked with sodium borate. Such a body has the consistency of a gel or solid with elastic properties and the body will tend to remain as a coherent slug until the cross links are broken or dissolved over time.

In a further example the body comprises cross-linked viscosifiers or gelling agents such as a cross-linked oil based gel made of a variety of hydrocarbon base fluids including mineral oil, crude oil, diesel, kerosene and fuel oils. Examples of such a viscosifier are commercially available under the Trade Mark "GEL 33" or "PETROGEL" from the Aubin Company in the UK and "GO-3" from Schlumberger and these have been used to good effect although other cross-linked viscosifiers could be used.

As the body of material approaches the leak site it is drawn towards the site due to the pressure differential and is pulled into the leak site. The flexible nature of the body of material ensures that it begins to extrude from the vessel. As the body of material is drawn through the leak, the sealing elements are constrained at the leak site and supported by the body of material until they are in turn, drawn into the leak site.

As will be appreciated, with the example of the body of material comprising cross-linked viscosifiers, as the body of material begins to be drawn through the leak, fluid flow through the leak will maintain the passage of the body of material and the links established through the long molecular chains within the material will help to pull more of the body of material through the leak, which in turn draws more sealing elements into the leak site.

Once the body of material has extruded from the leak site, the sealing elements remain entrained within the leak to effect a seal of the defect in the vessel wall.

As the sealing elements remain suspended in the body of material while the body of material extrudes through the leak, the sealing elements are effectively supported within the fluid flow in the vessel in the vicinity of the leak site until such time as seepage from the leak reduces or indeed is stopped altogether. This ensures that both a sufficient number of sealing elements are delivered to the required location in the vessel and also that the sealing elements which are deployed are not lost within the fluid flowing in the vessel thus improving the cost effectiveness of the sealing operation compared to prior art methods and compositions.

Therefore, the body of material acts as a carrier for the sealing elements and ensures that a concentration of sealing elements are transported through the duct and delivered to the leak site. This addresses the problem associated with the prior art methods of deploying the sealing elements directly into the flow of fluids within the duct without any means of delivering the sealing elements to the required location. In some applications the sealing elements must have substantially the same density as the fluids flowing in the duct and the present invention allows such sealing elements to be effectively delivered to the target zone within the duct.

In some embodiments the density of the body of material and/or the sealing elements and/or the combination of the two may be selected in response to the nature of the fluids flowing in the duct and/or the position of the leak site within the duct.

For example in a substantially horizontal duct, if the leak site is located towards the upper part of the duct, then the density of the material of the slug may be selected such that the body of material will rise within the fluid flowing in the duct. By providing the sealing elements on the outer surface of the body of material the likelihood of the sealing elements coming into contact with the leak site are substantially increased.

In contrast, if the leak site is located towards the lower part of the duct, the density of the material of the body of material may be selected such that the body of material will be transported within the fluid flowing in the duct close to the lower part of the duct such that when the body of material reaches the leak site it is more likely to be drawn to the leak site due to its proximity within the flowing fluids to the damaged part of the duct.

The present invention therefore provides the user with the means for delivering the sealing elements to the required location with the duct with a higher degree of accuracy than is currently achievable with the known methods described above and also ensures that the sealing elements, once delivered to the required location, are constrained at the leak site supported at that location until such time as they can be drawn into the leak to effect a seal of the leak.

The sealing elements of the sealing composition may be of any suitable size. Preferably, the sealing composition comprises a range of different sized sealing elements.

The sealing elements 3 may be formed into a shape corresponding to any one of planar-oblong, cubes, spheres, pyramids, octahedrons, tetrahedrons, thistle-seed shaped, filament shaped or of an irregular shape.

The body of material as described above may fill the bore or cross-sectional area of the duct with a length around 1-2 times its breadth. However in larger operations, the body of material may be many hundreds of meters long.

A lubricant 12 may be sprayed onto the outer surface of the body of material to facilitate the travel of the body of material within the duct.

It will be understood by a person skilled in the art that combining the use of sealing elements with a body of material which can deliver the sealing elements to the required location can increase the speed with which the sealing elements alone would travel through the fluids flowing in the duct. Therefore, the time taken to address the loss of fluids from the leak site and to effectively reduce or stop loss of fluids is decreased thereby representing a cost saving both on the materials required as a concentration of sealing elements is delivered to the leak site and also in reducing lost fluids from the duct. Speeding up the transport or delivery time of a concentration of the sealing elements to the leak site is particularly advantageous in that the flow of fluid towards or through the leak will drop off as the leak is occluded and therefore ensuring that a concentration of sealing elements are transported to the leak site increases the likelihood of completely sealing the leak.

A second embodiment of the present invention is shown in FIG. 2. In this embodiment, a thin membrane 5 surrounds the body of material to assist in delivering the concentration of sealing elements to the leak site.

The membrane may comprise an elastomeric material such as latex, natural rubber, NBR, HNBR and FKH or combinations thereof and may be provided in the form of a bag or balloon within which the body of material is contained. Alternatively, the membrane may be formed as a coating around the body of material.

The membrane 5 in this embodiment may be frangible and may be adapted to rupture upon contact with the leak site so that the contents of the membrane are only released once the body of material has reached the required location thereby ensuring that the maximum concentration of sealing elements are available at the leak site for sealing the site.

In this embodiment the membrane may be formed around the body of material of material by a known process.

Similarly as with the first embodiment, in this embodiment the density of the body of material 4 and/or the sealing elements 3 and/or the combination of the two may be selected in response to the nature of the fluids flowing in the duct and/or the position of the leak site within the duct.

A further embodiment of the present invention is shown in FIG. 3 of the drawings. In this embodiment the shape and size of the body of material may be selected to be similar to the inner surface 6 of the duct so as to form a slug 7 which is transportable through the duct. For example if the duct is a circular pipe, the slug of material may be cylindrical in shape with an outer diameter which is only slightly smaller than the inner diameter of the pipe to allow the slug to flow along the pipe. Alternatively the body of material may be solid or substantially solid such as in the form of a gel which travels through the duct or may be flexible or adaptable such that the body adapts to the same shape as the internal shape of the duct. In this embodiment the body of material may be large enough such that it fills the full diameter or cross section of the duct even which a change in cross section occurs.

Furthermore, in this embodiment the discrete sealing elements 3 are distributed around the outer surface of the body of material to ensure that a concentration of sealing elements is delivered to the leak site. Additionally or alternatively thereto, further sealing elements 3 may be distributed throughout the body of material.

In this embodiment the body of material removes the need for the density of the sealing elements to match that of the fluid flowing in the vessel. Furthermore, by placing the sealing elements on the outer surface of the body of material, removes the need to have the density tuned between the sealing elements and the fluid but also reduces the number of sealing elements required.

A further embodiment is illustrated in FIG. 4 in which similarly to embodiment three described above, the body of material is selected to have a shape and size to closely follow the shape and size of the inner surface 6 of the duct. In this embodiment the sealing elements 3 are deployed either upon or infront of or between the interface 8 between the body of material 4 and the fluid 2 flowing in the duct. FIG. 4 illustrates a vertical vessel and this embodiment is particularly suited to use in such vessels.

As the body of material flows along the duct, the sealing elements are transported or driven along the duct until they approach the leak site at which point they are drawn towards the leak site due to the pressure differential as discussed above.

It will be appreciated that the body of material 4 may comprise a fluid, the density of which is the same or different to the density of fluid flowing in the vessel.

In the embodiment illustrated, the density of the body of material is greater than that of the sealing elements and the sealing elements are selected to be buoyant relative to the fluid flowing in the vessel. In use, gravity acts upon the body of material to pull the body of material down the vessel. As the body of material moves downwards, the sealing elements are driven down the vessel. As with the earlier embodiments, the body of material is drawn to the leak site in the vessel. Due to the buoyant characteristics of the sealing elements in the fluid they are forced upwards against the underside of the body of material such that they encounter the leak as the body of material is drawn towards it. The body of material constrains the sealing elements in the vicinity of the leak and prevents them from passing back up the vessel and they become entrained within the leak and seal the leak where they can be held in position by the pressure of fluid flowing in the vessel.

As will be understood by the person skilled in the art, the examples illustrated show applications of the invention only for the purposes of illustration. In practice the invention may be applied to many different configurations, the detailed embodiments being straightforward for those skilled in the art to implement. Furthermore, any of the examples provided above for the body of material may be used in any of the embodiments of the invention as described.

For example the invention is equally applicable to many types of valve systems, and any kind of pipework such as water-carrying pipework.

As used herein, the terms leak site and defect are used interchangeably and are taken to mean any site at which unwanted seepage or leaking may occur.

Modifications and deviations from the invention may be envisaged without departing from the scope of the invention. Furthermore, aspects of any specific embodiment disclosed herein may be used independently in another aspect or embodiment of the invention as herein described. Additionally, any sealing composition described above may include sealing elements formed into one or more shapes of the same, similar or different sizes, or in a range of sizes.

The body of material of any of the embodiments described may also comprise an inhibiting agent to prevent enlargement of the leak such as by corrosion, once sealed.

Additionally or alternatively, any of the examples and embodiments described above may be modified to comprise a surfactant to promote the bond between the sealing element(s) and the body of material. Examples of surfactants include detergents such as for example sold under the trade mark DRIL-KLEEN II produced by MISwaco which is a detergent based surfactant with a specific gravity of 1.10, a PH (1% solution) of 9.3-9.5, solubility in water at 20° C. and a flashpoint >93° C. which may be applied to the sealing elements prior to their inclusion with water based gels. Domestic detergents such as washing up liquid may also be used.

It will be understood by the person skilled in the art that the body of material described above may comprise different materials each having a different density and the sealing elements may include different sized or shaped individual elements with different densities such that the order of arrival of sealing elements at the leak site in quick succession can be controlled.

In embodiments in which larger or heavier sealing elements are used, for example sealing elements greater than 20 mm in size or of greater density than 1200 kg/m$^3$, the amount of viscosified fluid or non-Newtonian viscosifiers present in the body of material may be increased.

By modifying the density of the body of material, the flow rate of the sealing composition through the vessel may be altered. For example, the density may be set such that the sealing composition is pumped, via a pump 10, into a vessel with sufficient force to push the sealing composition through the fluid flowing in the vessel but once pumping is stopped, the buoyancy of the sealing composition may be such that the composition returns to the top of the vessel.

Furthermore, the body of material may be substrate phobic and/or sealing element material phylic and/or vessel wall phylic. This will assist in keeping the body of material together as it travels through the vessel and increase the likelihood of the body of material to travel along the wall of the vessel which will give maximum probability for entrainment into leaks all around the vessel wall.

Additionally or alternatively, the body of material may be compressible to allow a mid deployment tuning of the density of the sealing composition such as to make sure it passes over a shaft in the vessel and drops to the bottom to seal a leak at that location.

Additionally or alternatively, the body of material may change state with pressure or temperature. This may assist in keeping the body of material and sealing elements together and protect the sealing composition in case of impacts such as when it encounters a bend or constriction in the vessel. Once the body of material reaches the leak site it may undergo a transformation such that a hard dome forms on the outer surface of the body of material and the inner portion of the body of material remains relatively soft.

If the body of material is highly cohesive then the body of material could go through orifices which are bigger than the sealing elements but smaller than the body of material.

As would be appreciated by the person skilled in the art, the methods and compositions of the present invention may be used to seal any leak or defect. In particular, but not exclusively, the methods and compositions of the present invention may be used to seal a leak or defect in a valve, pipe line, seal, vessel, duct, tubing and tubing joints e.g. pipe dope, and o-rings which have failed, remediation of a seal failure, a pig launcher/receiver, a hydrant, a heat exchanger or a gland.

The methods and sealing compositions of the present invention are suitable for use in a well bore. For instance, the methods and sealing mixtures of the present invention may be used to reduce fluid losses during drilling and closing water production zones.

When used to reduce drilling losses, the slug may be introduced through a drill pipe. Preferably, a range of different sized sealing elements are included to enable sealing of variable fractures and thief zones. After the fracture or defect has been sealed, hydrostatic forces exerted by the fluid filling the well can act to keep the sealing mixture in place. In this application of the methods and sealing mixtures of the present invention only a temporary seal is required as once drilling progresses, a casing may be used to seal off the fracture or defect. However, as would be appreciated by the person skilled in the art, the methods and sealing mixtures of the present invention may be used in any application to form a permanent seal if desired.

When used during water shut off procedures, the sealing compositions may include sealing elements comprised of an elastomeric material which swells in water and/or the sealing mixture may include sealing elements which dissolve in oil but are inert (i.e. do not dissolve) in water. The sealing composition of the present invention is introduced to the well bore and carried to the water shut off point or pore throat with pressure of the fluids forcing the sealing elements into the formation or pore throat.

The methods and sealing compositions of the present invention may also be used to seal leaks in an annulus or leaks between concentric annuli, e.g. A to B to C annulus leaks, or leaks in a pipe in pipe situation, leaks in sand control screens, leaks in control lines during completion of a well, and leaks in subsurface safety valves (SSSVs) and surface-controlled subsurface safety valves (SCSSVs).

The methods and sealing compositions of the present invention are also suitable for use within the water and gas industries, both in a commercial and a municipal setting. For instance, the methods and sealing compositions of the present invention could be used to seal leaks present in any part of the infrastructure associated with wastewater capture, transportation, storage and treatment, raw water capture, transportation, delivery and storage and potable water treatment, storage, capture, transportation and delivery, and brackish and desalinated water capture, treatment, transportation, delivery and storage, portable water treatment, capture, storage and transportation.

Additionally, the methods and sealing compositions of the present invention are suitable for use in sealing leaks in or at any point within the infrastructure associated with irrigation systems and the treatment, storage, capture and transportation and delivery of fluids through irrigation systems.

Furthermore, the methods and sealing compositions of the present invention are suitable for use in sealing leaks within delivery, storage, treatment and capture of gas, e.g. natural gas. The methods and sealing compositions of the present invention may also be used seal leaks in carbon capture and storage systems.

It is also to be appreciated that the methods and sealing compositions of the present invention are also suitable for use in sealing or mitigating leaks in wells, umbilicals, pipework caissons, storage fill lines, flexible pipes, tubing joints and control lines from horizontal to the vertical, downhole lost circulation, drilling losing and non-productive zones, trunk mains, distribution mains, supply pipes, joints, reservoirs, fire systems, washing systems, industrial water pipes, industrial supply pipes, all of which are considered to fall within the term "vessel".

Moreover, the delivery methods and compositions of the present invention may be used during assembly of a tool, e.g. a completion tool, to lubricate any seals or valves within the tool, thereby providing a reservoir of sealing composition within the assembled tool. Thus, if a leak occurs in the tool at the site of a seal or a valve, the sealing composition of the present invention is already in place to seal the leak.

The body of material may assist in sealing the leak in the vessel. For example, the body of material may exert a force onto the sealing elements to ensure that they enter the leak site or deform to seal the leak and also to resist micro cracks forming between the sealing elements.

The body of sealing material may, in some embodiments, change state upon contact with the leak site. For example, the body of material may strain harden or may harden through shear forces applied to the body on contact with the edges of the vessel wall surrounding the leak. In these embodiments the body of material may assist in bonding a group of sealing elements into the leak in the vessel wall.

In some embodiments the body of material and sealing elements may be deployed into the vessel in a sealed container 11, for example but not limited to a pipeline pig or a wireline tool. As the container 11 approaches the leak site, or alternatively once it reaches the leak site, the body of material and sealing elements may be forced from the container 11 onto the leak site by means generally available to the skilled person. Methods according to the present invention may include sealing the container 11 in position within the vessel at or adjacent the leak site prior to forcing the body of material 4 and the sealing elements 3 from the container 11.

In a further embodiment, the body of material and the sealing elements of any of the embodiments described above may be injected into the vessel through a coiled tubing string which is directed at the leak site. In such an embodiment a seal may be provided between the coiled tubing and the interior wall of the vessel to hold the coiled tubing in the required position.

Referring now to FIG. 5, a process 500 of delivering a concentrated quantity of sealing elements to a leak site in a vessel includes steps 502-508. At step 502, a flexible body of material and at least one sealing element are deployed into fluid flowing within the vessel upstream of the leak site. At step 504, the body of material transports the at least one sealing element through the vessel to the leak site where the body of material is drawn to a leak of the leak site by fluid flow created by a pressure differential at the leak site. The at least one sealing element is constrained by the body of material at the leak site such that the at least one sealing element becomes entrained within the leak. At step 506, the passage of the body of material through the vessel is controlled by varying the density of the body of material to ensure that the body of material flows through the vessel at the optimum position to be drawn to the leak site. The density of the body of material is selected in response to the position of the leak site upon the inner surface of the vessel.

The passage of the body of material through the vessel may be controlled by varying the density of the at least one sealing element. The density of the body of material may be selected in response to the density of the fluids flowing within the vessel. The at least one sealing element may be provided on or within the body of material and is/are transported on or within the body of material to the leak site. The at least one sealing element may be introduced into the vessel downstream of the body of material such that as the body of material flows along the vessel it drives the at least one sealing element through the vessel.

The body of material may prevent the at least one sealing element from rising to the surface of the vessel. The body of material may be contained within a frangible membrane. In such a case, the membrane may be rupturable upon impact with the leak site to deliver the at least one sealing element directly to the leak site. The at least one sealing element may be located on the interface between the body of material and the fluids flowing within the vessel.

The at least one sealing element may be located in front of the interface between the body of material and the fluids flowing within the vessel. The shape and size of the body of material may be selected to match the interior shape and size of the vessel. The deploying step 502 may include the body of material being pumped into the vessel.

Upon deployment the body of material may fill the entire diameter or internal cross-section of the vessel. In some embodiments, the body of material and the at least one sealing element may be deployed in step 502 in a sealed container. In some embodiments, the body of material and the at least one sealing element may also be deployed in step 502 within a pipeline pig or a wireline tool.

In some embodiments, as the container approaches the leak site, or alternatively once it reaches the leak site, the body of material and the at least one sealing element may be forced from the container onto the leak site as part of step 504. In some embodiments, the container may be sealed in position within the vessel at or adjacent the leak site prior to forcing the body of material and the at least one sealing element from the container as part of step 504. The vessel may be a valve, pipe, o-ring or a duct.

The body of material being is typically adapted to transport the at least one sealing element in a controllable and targeted manner to a leak site within a vessel and to constrain the at least one sealing element at the leak site. The sealing composition may comprise a membrane that surrounds the body of material. The body of material and the at least one sealing element may form a composition slug that is transportable through the vessel by fluids flowing within the vessel. The body of material may include a gel or a viscosifier. The sealing composition may also include Xanthium gum or guar gum crosslinked with agents including borax or sodium borate. The at least one sealing element may be elastomeric.

The density of the body of material and/or the density of the at least one sealing element may be selected depending upon the density of the fluids flowing in the vessel. The density of the body of material and/or the density of the at least one sealing element may be selected such that the sealing composition floats within the fluid flowing in the vessel. The density of at least one of the body of material and the density of the at least one sealing element may be selected such the sealing composition travels along the vessel at a submerged position within the fluid flow. The membrane may be relatively thin in comparison to the size of the body of material and may be frangible.

The membrane may be adapted to rupture (step 508) upon impact with the leak site to ensure that a concentration of the at least one sealing element is delivered to the leak site. The membrane may include an elastomeric material. The membrane may include at least one of latex, natural rubber, NBR, HNBR and FKM. The at least one sealing element may be provided on the outer surface of the body of material. The at least one sealing element is provided on an interface of the body of material and the fluid flowing within the vessel. The at least one sealing element may be provided on an interface of the body of material and the interior surface of the vessel.

The at least one sealing element may be suspended in the body of material. The at least one sealing element may be uniformly distributed through the body. The at least one sealing element may be randomly distributed through the body of material. The body of material may be adapted to degrade over time such that the body will eventually dissolve within the fluids flowing in the vessel. The body of material may be adapted to undergo a change or degrade based upon the temperature within the vessel, a change in temperature within the vessel or within the fluid flowing in the vessel, a reaction to an agent such as a chemical agent deployed into the vessel or in response to light stimulation, such as by ultraviolet light. The body of material may have a higher viscosity than the fluid(s) flowing within the vessel. The body of material may include a material similar or identical to the fluids flowing in the vessel.

A lubricant may be applied to the outer surface of the body of material to assist in transport of the body of material and the at least one sealing element through the vessel. The sealing composition may include a range of different sized sealing elements. The at least one sealing element may include at least one of an elastomeric material, silicone rubbers, polyurethane rubbers, natural rubbers, nitrile rubbers, and a flouropolymer elastomer. The at least one sealing element may be formed into a shape corresponding to any one of planar-oblong, cubes, spheres, pyramids, octahedrons, tetrahedrons, filament shaped or an irregular shape.

The invention claimed is:

1. A method of delivering a concentrated quantity of sealing elements to a leak site in a vessel, the method comprising:
    deploying a flexible body of material and at least one sealing element into fluid flowing within the vessel upstream of the leak site;
    the body of material transporting the at least one sealing element through the vessel to the leak site where the body of material is drawn to a leak of the leak site by fluid flow created by a pressure differential at the leak site;
    wherein the at least one sealing element is constrained by the body of material at the leak site such that the sealing element(s) become(s) entrained within the leak; and
    wherein the body of material is contained within a frangible membrane and the method further comprises rupturing the membrane upon impact with the leak site to deliver the at least one sealing element directly to the leak site.

2. A sealing composition comprising a flexible body of material and at least one sealing element, the body of material being adapted to transport the at least one sealing element in a controllable and targeted manner to a leak site within a vessel and to constrain the at least one sealing element at the leak site; and
    wherein the body of material is adapted to undergo a change or degrade for based upon the temperature within the vessel, a change in temperature within the vessel or within the fluid flowing in the vessel, a reaction to an agent such as a chemical agent deployed into the vessel or in response to light stimulation, such as by ultraviolet light.

3. A sealing composition comprising a flexible body of material and at least one sealing element, the body of material being adapted to transport the at least one sealing element in a controllable and targeted manner to a leak site within a vessel and to constrain the at least one sealing element at the leak site; and
    wherein a lubricant is applied to the outer surface of the body of material to assist in transport of the body of material and the at least one sealing element through the vessel.

4. A method of delivering a concentrated quantity of sealing elements to a leak site in a vessel, the method comprising:
    deploying a flexible body of material and at least one sealing element into fluid flowing within the vessel upstream of the leak site;
    the body of material transporting the at least one sealing element through the vessel to the leak site where the body of material is drawn to a leak of the leak site by fluid flow created by a pressure differential at the leak site;
    wherein the at least one sealing element is constrained by the body of material at the leak site such that the at least one sealing element becomes entrained within the leak; and
    wherein the at least one sealing element is introduced into the vessel downstream of the body of material such that as the body of material flows along the vessel it drives the at least one sealing element through the vessel.

5. A method according to claim 4, wherein the body of material prevents the at least one sealing element from rising to the surface of the vessel.

6. A method according to claim 4, wherein the at least one sealing element is located in front of the interface between the body of material and the fluids flowing within the vessel.

7. A method of delivering a concentrated quantity of sealing elements to a leak site in a vessel, the method comprising:
deploying a flexible body of material and at least one sealing element into fluid flowing within the vessel upstream of the leak site;
the body of material transporting the at least one sealing element through the vessel to the leak site where the body of material is drawn to a leak of the leak site by fluid flow created by a pressure differential at the leak site;
wherein the at least one sealing element is constrained by the body of material at the leak site such that the at least one sealing element becomes entrained within the leak; and
wherein the passage of the body of material through the vessel is controlled by varying the density of the body of material to ensure that the body of material flows through the vessel at the optimum position to be drawn to the leak site; and
wherein the density of the body of material is selected in response to the position of the leak site upon the inner surface of the vessel.

8. A method according to claim 7, wherein the passage of the body of material through the vessel is controlled by varying the density of the at least one sealing element element(s).

9. A method according to claim 7, wherein the density of the body of material is selected in response to the density of the fluids flowing within the vessel.

10. A method according to claim 7, wherein the at least one sealing element is provided on or within the body of material and is/are transported on or within the body of material to the leak site.

11. A method according to claim 7, wherein the at least one sealing element is located on the interface between the body of material and the fluids flowing within the vessel.

12. A method according to claim 1, wherein the shape and size of the body of material is selected to match the interior shape and size of the vessel.

13. A method according to claim 7, wherein the body of material is pumped into the vessel.

14. A method according to claim 7, wherein upon deployment the body of material fills the entire diameter or internal cross-section of the vessel.

15. A method according to claim 7, in which the vessel is a valve, pipe, o-ring or a duct.

16. A method according to claim 7, wherein the body of material and the at least one sealing element are deployed in a sealed container.

17. A method according to claim 16, wherein the body of material and the at least one sealing element are deployed within a pipeline pig or a wireline tool.

18. A method according to claim 16, wherein as the container approaches the leak site, or alternatively once it reaches the leak site, the body of material and the at least one sealing element are forced from the container onto the leak site.

19. A method according to claim 16, further comprising the step of sealing the container in position within the vessel at or adjacent the leak site prior to forcing the body of material and the at least one sealing element from the container.

20. A sealing composition comprising a flexible body of material and at least one sealing element, the body of material being adapted to transport the at least one sealing element in a controllable and targeted manner to a leak site within a vessel and to constrain the at least one sealing element at the leak site; and
wherein the sealing composition further comprises a membrane, the membrane surrounding the body of material.

21. A sealing composition according to claim 20, wherein the body of material and the at least one sealing element form a composition slug which is transportable through the vessel by fluids flowing within the vessel.

22. A sealing composition according to claim 20, wherein the body of material comprises a gel.

23. A sealing composition according to claim 20, wherein the at least one sealing element is elastomeric.

24. A sealing composition according to claim 20, wherein the membrane is relatively thin in comparison to the size of the body of material.

25. A sealing composition according to claim 20, wherein the at least one sealing element is element(s) is/are provided on the outer surface of the body of material.

26. A sealing composition according to claim 20, wherein the at least one sealing element is provided on an interface of the body of material and the fluid flowing within the vessel.

27. A sealing composition according to claim 20, wherein the at least one sealing element is provided on an interface of the body of material and the interior surface of the vessel.

28. A sealing composition according to claim 20, wherein the body of material is adapted to degrade over time such that the body will eventually dissolve within the fluids flowing in the vessel.

29. A sealing composition according to claim 20, wherein the body of material has a higher viscosity than the fluid(s) flowing within the vessel.

30. A sealing composition according to claim 20, wherein the body of material comprises a material similar or identical to the fluids flowing in the vessel.

31. A sealing composition according to claim 20, wherein the sealing composition comprises a range of different sized sealing elements.

32. A sealing composition according to claim 20, wherein the at least one sealing element comprises at least one of an elastomeric material, silicone rubbers, polyurethane rubbers, natural rubbers, nitrile rubbers, a flouropolymer elastomer.

33. A sealing composition according to claim 20, wherein the at least one sealing element is formed into a shape corresponding to any one of planar-oblong, cubes, spheres, pyramids, octahedrons, tetrahedrons, filament shaped or an irregular shape.

34. A sealing composition according to claim 20, wherein the membrane comprises an elastomeric material.

35. A sealing composition according to claim 34, wherein the membrane comprises at least one of latex, natural rubber, NBR, HNBR and FKM.

36. A sealing composition according to claim 20, wherein the body of material comprises a viscosifier.

37. A sealing composition according to claim 36, wherein the sealing composition comprises Xanthium gum or guar gum crosslinked with agents including borax or sodium borate.

38. A sealing composition according to claim 20, wherein the membrane is be frangible.

39. A sealing composition according to claim 38, wherein the membrane is adapted to rupture upon impact with the leak site to ensure that a concentration of the at least one sealing element is delivered to the leak site.

40. A sealing composition according to claim 20, wherein the density of the body of material and or the density of the at least one sealing element is selected depending upon the density of the fluids flowing in the vessel.

41. A sealing composition according to claim 40, wherein the density of the body of material and or the density of the at least one sealing element is selected such that the sealing composition floats within the fluid flowing in the vessel.

42. A sealing composition according to claim 40, wherein the density of at least one of the body of material and the density of the at least one sealing element is selected such the sealing composition travels along the vessel at a submerged position within the fluid flow.

43. A sealing composition according to claim 20, wherein the at least one sealing element is element(s) is/are suspended in the body of material.

44. A sealing composition according to claim 43, wherein the at least one sealing element is uniformly distributed through the body.

45. A sealing composition according to claim 43, wherein the at least one sealing element is randomly distributed through the body of material.

\* \* \* \* \*